(12) United States Patent
Sadiq et al.

(10) Patent No.: US 8,951,343 B2
(45) Date of Patent: Feb. 10, 2015

(54) ULTRA HIGH PERFORMANCE CONCRETE REINFORCED WITH LOW-COST GRAPHITE NANOMATERIALS AND MICROFIBERS, AND METHOD FOR PRODUCTION THEREOF

(75) Inventors: Muhammad Maqbool Sadiq, East Lansing, MI (US); Anagi Manjula Balachandra, Okemos, MI (US); Parviz Soroushian, Okemos, MI (US)

(73) Assignee: Metna Co., Lansing, MI (US)

( * ) Notice: Subject to any disclaimer, the term of this patent is extended or adjusted under 35 U.S.C. 154(b) by 198 days.

(21) Appl. No.: 13/600,358

(22) Filed: Aug. 31, 2012

(65) Prior Publication Data

US 2014/0060388 A1    Mar. 6, 2014

(51) Int. Cl.
     *C04B 28/04*           (2006.01)

(52) U.S. Cl.
     USPC ............................ 106/644; 106/713; 106/724

(58) Field of Classification Search
     CPC ........ C04B 28/04; C04B 16/00; C04B 14/48; C04B 18/06
     USPC ......................................... 106/644, 713, 724
     See application file for complete search history.

(56) References Cited

U.S. PATENT DOCUMENTS 7,666,327 B1     2/2010    Veedu et al.

OTHER PUBLICATIONS

O. Breuer and U. Sundaraj, Big returns from small fibers: A review of polymer/carbon nanotube composites, Polymer Composites, 2004, 630-645, 25(6).
K. H. Kalaitzidou and Fukushima, Multifunctional polypropylene composites produced by incorporation of exfoliated graphite nanoplatelets, Carbon, 2007, 1446-145, 45(7).
K. H. Kalaitzidou and Fukushima, Mechanical properties and morphological characterization of exfoliated graphite-polypropylene nanocomposites, Composites Part A, 2007, 1675, 38.
J. Li and M. L. Sham, Morphology and properties of UV/ozone treated graphite nanoplatelet/epoxy nanocomposites, Composites Science and Technology, 2007, 296-305, 67(2).

*Primary Examiner* — Paul Marcantoni

(57) ABSTRACT

Ultra-high-performance cementitious materials are made using suitably functionalized and relatively low-cost carbon nanofibers and graphite platelets. Polyelectrolytes and surfactants are physisorbed upon these graphite nanomaterials in water, and dispersion of nanomaterials in water is achieved by stirring. Stable and well-dispersed suspensions of nanomaterials in water are realized without using energy-intensive and costly methods, and also without the use of materials which could hinder the hydration and strength development of ultra-high-performance cementitious materials. The water incorporating dispersed nanomaterials is then mixed with the cementitious matrix and, optionally, microfibers, and cured following standard concrete mixing and curing practices. The resulting cementitious materials incorporating graphite nanomaterials and optionally microfibers offer a desired balance of strength, toughness, abrasion resistance, moisture barrier attributes, durability and fire resistance.

31 Claims, 10 Drawing Sheets

(a)

(b)

(c)

(a)

(b)

(c)

(a)

(b)

(c)

(a) Impact Specimens with nanofibers (b) Abrasion Specimens with nanofibers

ULTRA HIGH PERFORMANCE CONCRETE REINFORCED WITH LOW-COST GRAPHITE NANOMATERIALS AND MICROFIBERS, AND METHOD FOR PRODUCTION THEREOF

STATEMENT REGARDING FEDERALLY SPONSORED RESEARCH & DEVELOPMENT

The invention was made in part with the U.S. Government support under the National Science Foundation Grant No. IIP-1142455. The U.S. Government has certain rights in the invention.

CROSS-REFERENCE RELATED TO THIS APPLICATIONS

Not applicable.

FIELD OF THE INVENTION

The invention relates to enhancement of cement-based materials and, more specifically, the invention relates to methods of producing cement-based nanocomposite materials incorporating modified carbon nanofibers and graphite nanoplatelets.

BACKGROUND OF THE INVENTION

The following is a tabulation of some prior art that presently appears relevant:

U.S. PATENTS

| Patent No. | Kind Code | Issue Date | Patentee |
| --- | --- | --- | --- |
| U.S. Pat. No. 7,666,327 | B1 | Feb. 23, 2010 | Veedu et. al |

U.S. Patent Application Publications

| Patent Application No. | Kind Code | Pub. Date | Applicant |
| --- | --- | --- | --- |
| US 2008/0134942 | A1 | Jun. 12, 2008 | Brenner et. al |
| US 2009/0229494 | A1 | Sep. 17, 2009 | Shah et. al |

Non Patent Literature Documents

Breuer, O. and U. Sundararaj (2004). "Big returns from small fibers: A review of polymer/carbon nanotube composites." *Polymer Composites* 25(6): 630-645.

Kalaitzidou, K., H. Fukushima, et al. (2007). "Multifunctional polypropylene composites produced by incorporation of exfoliated graphite nanoplatelets." *Carbon* 45(7): 1446-1452.

Kalaitzidou, K., H. Fukushima, et al. (2007). "Mechanical properties and morphological characterization of exfoliated graphite-polypropylene nanocomposites." *Composites Part A: Applied Science and Manufacturing* 38(7): 1675-1682.

Li, J., M. L. Sham, et al. (2007). "Morphology and properties of UV/ozone treated graphite nanoplatelet/epoxy nanocomposites." *Composites Science and Technology* 67(2): 296-305.

Cement- and concrete-based materials offer suitable engineering properties (compressive strength, moisture resistance and durability) at low cost, combined with energy-saving and ecological benefits. They constitute the most widely used class of manufactured materials worldwide. Cement-based materials offer important advantages over competing construction materials in terms of ecological impact (pollution, deforestation, use of exhaustible raw materials, etc.) (Mehta, A. et al "Concrete" Prentice Hall, 1993). Cement-based materials, however, lack adequate toughness and impact resistance; further improvement of their durability in aggressive environments would also yield major benefits in terms of the life-cycle cost of infrastructure systems. Enhancement of cement-based materials with graphite nanomaterials builds upon and complements the successful and growing practice of reinforcing cement-based materials with micro-scale fibers. Applications of high-performance concrete with greater demands for structural performance, durability and safety can benefit from the use of cement-based products enhanced with graphite nanomaterials alone or in combination with micro-scale fibers.

Graphite nanomaterials, when compared with today's (micro-scale) fibers, offer distinctly high mechanical and physical attributes as well as enormous surface areas and very close spacing within matrix even at low volume fractions (below 0.1%). The distinct qualities of graphite nanomaterials can be used beneficially in high-performance cement-based materials by thorough dispersion of nanomaterials within the matrix and effective interfacial interactions between nanomaterials and cement hydrates. The high surface area of nanomaterials generates strong tendencies towards agglomeration (via van der Waals adhesion). The surfaces of graphite nanomaterials are largely inert, and offer limited potentials for chemical bonding to cement hydrates. The advantages of graphite nanomaterials over micro-scale fibers in terms of mechanical, physical and geometric attributes benefit: (i) control of defect size and propagation in cement-based materials; (ii) energy dissipation via frictional pullout; and (iii) tortuosity of the diffusion and crack propagation paths. The spacing of typical graphite nanomaterials within matrix is three orders of magnitude smaller than that of typical carbon fibers at similar volume fractions; the surface area of nanomaterials available for bonding and frictional energy dissipation is typically two orders of magnitude greater than that of micro-scale fibers. The damaging effects of mechanical loads and aging are generally manifested in concrete as inception and growth of micro-cracks within the aggregate-paste interfacial transition zones and the bulk cementitious paste. Closely spaced graphite nanomaterials exhibit a strong presence within the bulk paste and at interfacial zones in concrete. Their close (nanoscale) spacing and high specific surface area make them highly effective in suppression of micro-crack inception (and initial growth) and control of micro-crack propagation by effectively interacting with micro-crack tips. Longer microscale fibers, on the other hand, are particularly effective in bridging across wider cracks, and mitigating their further opening. Unlike micro-scale fibers which do not benefit the barrier qualities of concrete, the closely spaced nanomaterials force tortuous diffusion paths into concrete, which enhance the barrier qualities (impermeability and diffusion/sorption resistance) of concrete.

Carbon nanotubes offer highly desired geometric, mechanical and physical attributes for use as reinforcement in cement-based materials. Their price and production capacity, however, preclude tem from widespread use in cement-based materials in the near future. The lower-cost alternatives to carbon nanotubes for nano-scale reinforcement of cement-based materials are carbon nanofibers and graphite nanoplatelets.

Carbon nanofibers consist of stacked conical graphite planes with a hollow core; the graphite basal planes are oriented at about 25° with respect to the nanofiber longitudinal axis. Their inner diameter ranges from 30 to 90 nanometer, and their length from 50 to 100 micrometer (with aspect ratios ranging from 100 to 500). The tensile strength and elastic modulus of carbon nanofibers are about 3 GPa and 240 GPa, respectively, and their thermal conductivity is quite high at about 1,950 W/(m·K). Carbon nanofibers are now produced at relatively large quantities, and their current cost is much lower than that of carbon nanotubes (Breuer and Sundararaj 2004). One of the most outstanding features of carbon nanofibers is the presence of a large number of edges on their surfaces, which present sites readily available for functionalization. Carbon nanofibers are generally vapor-grown; this process tends to deposit a layer of (less graphitic) carbon upon nanofibers, which could adhere the nanofibers together (Tibbetts, Lake et al. 2007).

Graphite nanoplatelets are obtained by exfoliation of natural graphite; their thickness can be controlled within a range from 1 to 25 nm (noting that the thickness of an individual grapheme layer is about 0.5 nm), and their diameter from the sub-micrometer level to tens of micrometers. Graphite, in its basal plane, offers elastic modulus of 1,060 GPa, thermal conductivity of 250 W/m·K, and electrical resistivity of $4 \times 10^{-5}$ $\Omega$·cm (Kalaitzidou, Fukushima et al. 2007; Kalaitzidou, Fukushima et al. 2007; Li, Sham et al. 2007). Stress concentrations at the rough edges of graphite nanoplatelets lower their tensile strength.

The potential for enhancement of cementitious materials through introduction of graphite nanomaterials can be realized as far as challenges associated with the processing requirements and the relatively high cost of cementitious nanocomposites. The cost of cementitious nanocomposites can be lowered by using relatively low-cost graphite nanomaterials, including carbon nanofiber and graphite nanoplatelet (in lieu of carbon nanotube) and also through the use of hybrid reinforcement comprising graphite nanomaterials and low-cost micro-scale fibers. As far as the processing challenges are concerned, successful use of graphite nanomaterials in cement-based matrices requires: (i) thorough dispersion of individual nanomaterials within the aqueous fresh mix; and (ii) adequate bonding of cement hydrates to nanomaterial surfaces for effective interfacial stress transfer. The generally hydrophobic surfaces of graphite nanomaterials would, in the aqueous cementitious mix, have energetic preference for bonding to each other (i.e., agglomerating) versus exposing their surfaces to the aqueous environment. Agglomeration of graphite nanomaterials undermines their reinforcement efficiency in cementitious materials. The hydrophobic surfaces of graphite nanomaterials can be made hydrophilic through introduction of selected functional groups, microwave irradiation, covalent tethering, or by physisorption of polyelectrolytes and surfactants to facilitate their thorough dispersion in aqueous media. These measures can also enable effective interactions of cement hydrates with nanomaterial surfaces. Selection of a dense cement-based matrix with a smooth particle size gradation, covering nano- to micro-scale range, can further benefit the dispersion and interfacial interactions of graphite nanomaterials. This would lead to effective mobilization of the tremendous mechanical qualities of carbon nanotubes within cementitious nanocomposites.

The large surface area and close spacing of graphite nanomaterials as well as their slender geometry provide for effective control of the initiation and propagation of nano- and micro-scale cracks in cementitious matrix. The effectiveness of nano-scale reinforcement diminishes as the crack width increases, especially in matrices with coarser cement hydrates and higher porosity. Given the effectiveness of micro-scale fibers in arresting larger cracks, nano- and micro-scale (hybrid) reinforcement systems can render synergistic effects in cementitious matrices. Control of crack growth by hybrid reinforcement at different scales benefits the mechanical performance and durability of cementitious materials.

The new ultra-high-performance concrete nanocomposite would be of particular value towards improvement of the safety and reliability of mission-critical infrastructure systems, and would also benefit broader infrastructure systems by providing balanced gains in mechanical, physical and durability characteristics at viable initial cost.

Past efforts towards development of high-performance cementitious matrices reinforced with nanomaterials have been largely limited to reinforcement of very fine (e.g., cementitious paste) matrices with multiwalled carbon nanotubes. Such fine matrices are of limited practical value, and the use of carbon nanotubes in cementitious materials is not economically viable. U.S. Pat. No. 7,666,327 B1 covers inclusion of carbon nanotubes in cement-based matrices. A multi-step process is used for dispersion of nanotubes, which employs materials that can negatively impact the hydration process and early-age strength development of concrete. The matrix selected is also of normal strength and relatively high porosity; the relatively high porosity and limited binding qualities of this matrix compromise the potential for mobilizing the mechanical qualities of carbon nanotubes through effective interfacial shear stress transfer.

SUMMARY OF THE INVENTION

The present invention involves pretreatment and dispersion procedures which enable thorough and cost-effective dispersion of graphite nanomaterials of different types in a water-based solution to be added to concrete, and improves the interfacial interactions of graphite nanomaterials with cement hydrates in a well-graded high-performance cement-based matrix.

In an embodiment of the invention, graphite nanomaterials are wrapped with polymer chains, and optimized stirring and ultrasonication are used to effectively disperse the polymer-wrapped graphite nanomaterial in a water-based solution, which will then be mixed with other concrete ingredients and cured using normal concrete mixing and curing procedures. The dispersion of graphite nanomaterials in water remains stable for extended time periods.

As a result of the thorough dispersion and effective interfacial interactions enabled by the invention, graphite nanomaterials at relatively low volume fractions of about 0.03% to 0.6% of cementitious binder bring about balanced gains in different engineering properties of concrete, including strength, toughness, impact resistance, abrasion resistance, barrier qualities and durability characteristics. These balanced contributions of graphite nanomaterials to concrete properties enabled by the present invention, which can be realized cost-effectively using relatively low volume fractions of low-cost graphite nanomaterials, cannot be matched by micro-scale fiber reinforcement systems used in concrete.

Optimum reinforcement systems can be developed through complementary use of graphite nanomaterials, enabled by the pretreatment and dispersion methods of the present invention, and conventional micro-scale fibers. Such optimum reinforcement systems offer the potential to improve the service life, sustainability and life-cycle economy of concrete-based infrastructure systems, and to bring about improvements in the following properties of concrete: (i) blast and impact resistance; (ii) toughness and energy absorption capacity; (iii) fire resistance; (iv) abrasion resistance; (v) fatigue life; (vi) tensile/flexural strength and crack resistance; (vii) impermeability and durability in aggressive environments; (viii) damage monitoring and self-sensing capabilities.

The above improvements in concrete properties benefit diverse fields of application, including:
- military shelters and mission-critical structures (requiring enhanced blast, fire, chemical and seismic resistance);
- hydraulic structures (requiring enhanced impermeability, durability, flexural strength, crack resistance, and abrasion, erosion and impact resistance);
- water, sewer and nuclear waste containment and infrastructure systems (requiring enhanced barrier qualities, blast, impact, seismic, fire and chemical resistance, durability, flexural strength and crack resistance); and
- airfield and highway pavements, bridge decks and parking structures (requiring damage monitoring, enhanced fatigue life, abrasion and impact resistance, durability, impermeability, flexural strength and crack resistance).

DETAILED DESCRIPTION OF THE INVENTION

Figure 1:
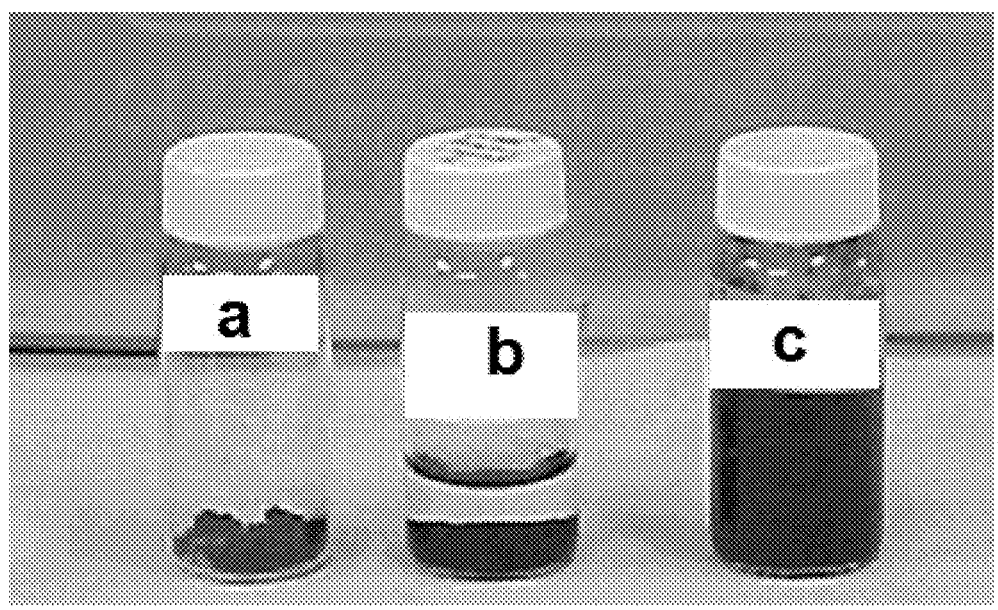
FIG. 1 is a photograph showing the dispersion of PAA-physisorbed graphite nanomaterials in water prepared using optimum stirring and sonication procedure.
Figure 2:
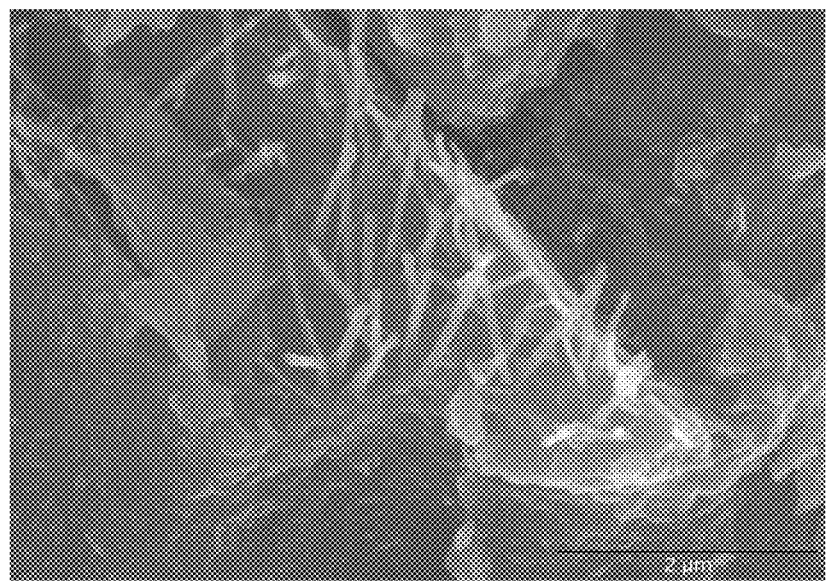
FIGS. 2(a), 2(b) and 2(c) depict scanning electron microscope (SEM) images of the fracture surfaces of ultra-high-performance cementitious matrix reinforced with PAA-physisorbed carbon nanofibers dispersed using optimum stirring and sonication procedures.
Figure 2:
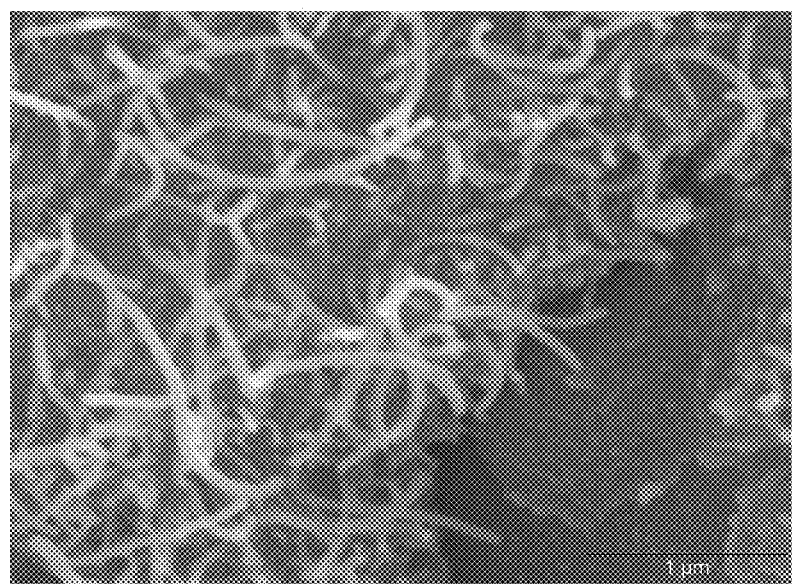
Figure 2:
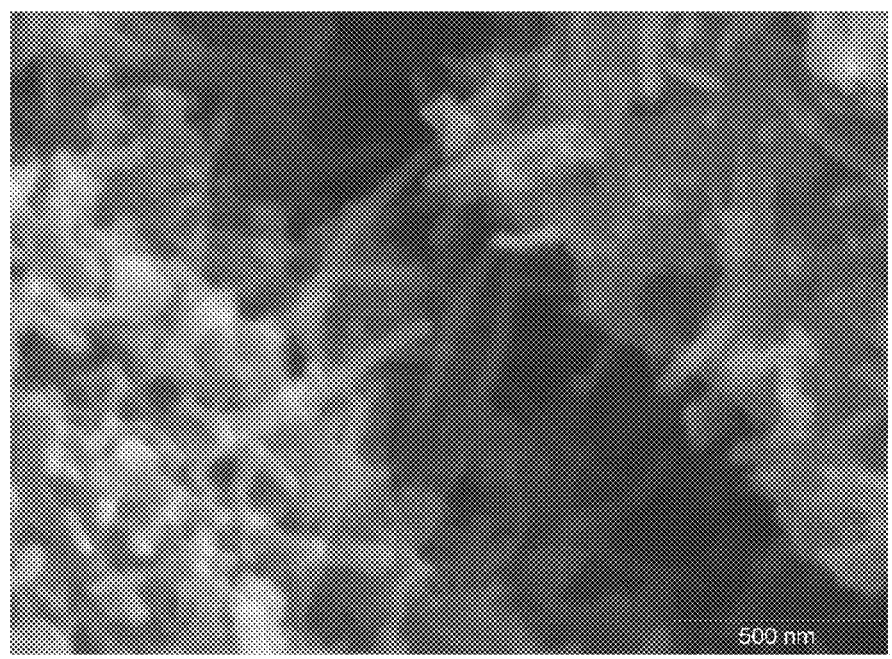
Figure 3:
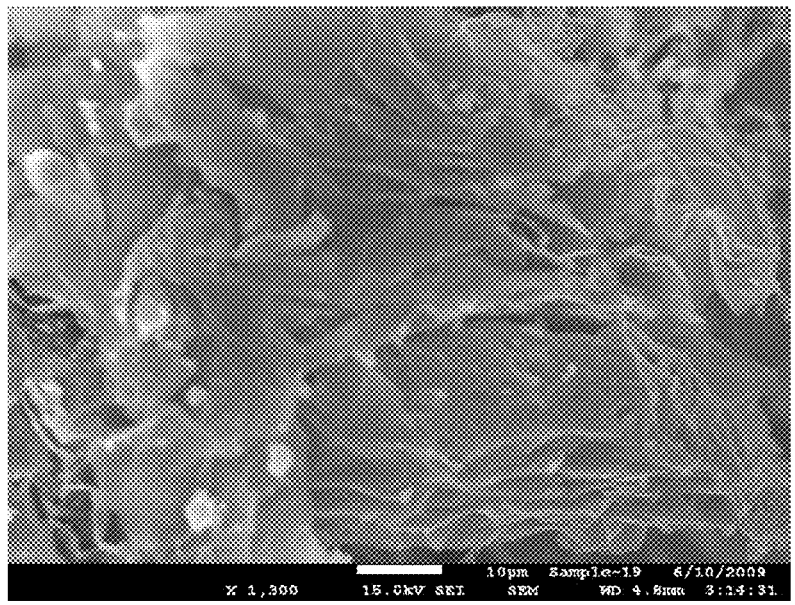
FIGS. 3(a), 3(b) and 3(c) depict SEM images of the fracture surfaces of ultra-high-performance cementitious matrix reinforced with graphite nanoplatelets dispersed using optimum stirring and sonication procedure.
Figure 3:
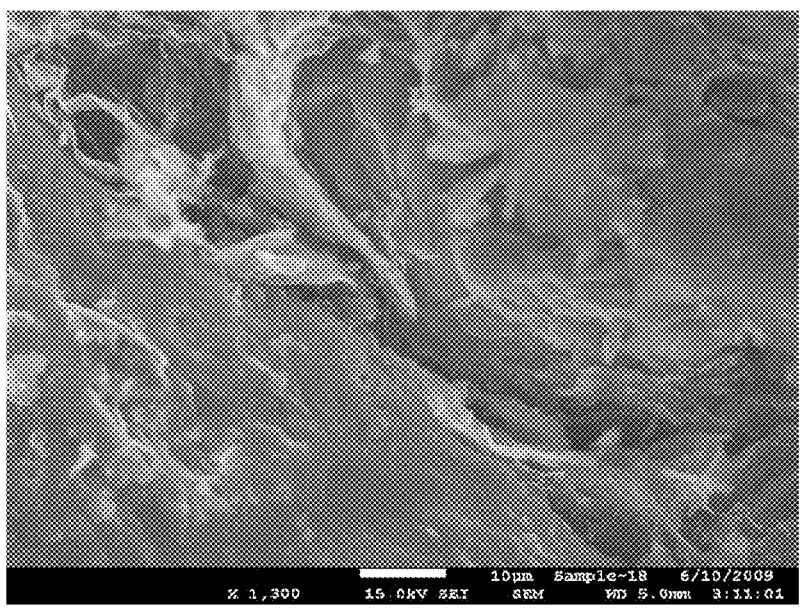
Figure 3:
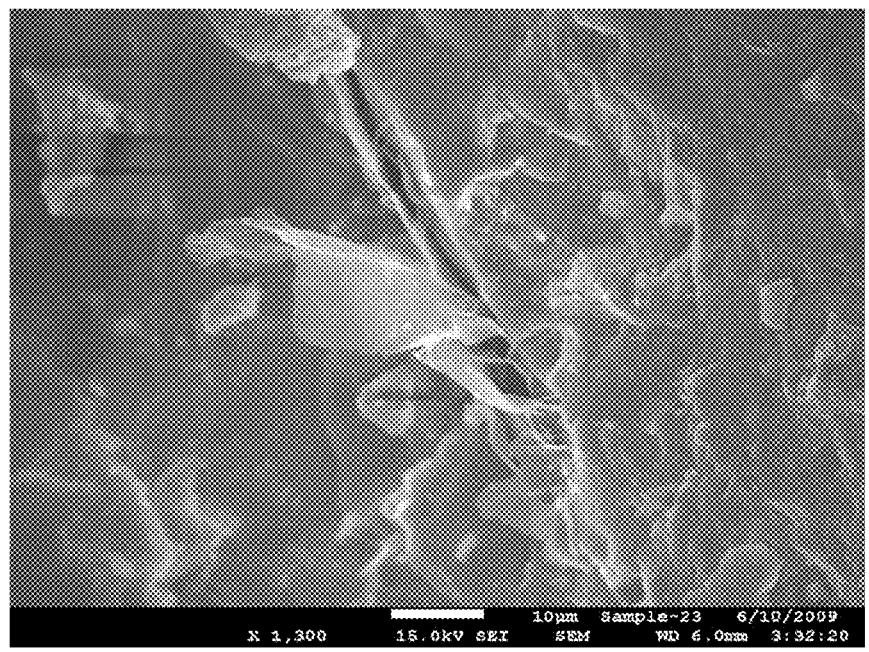
Figure 4:
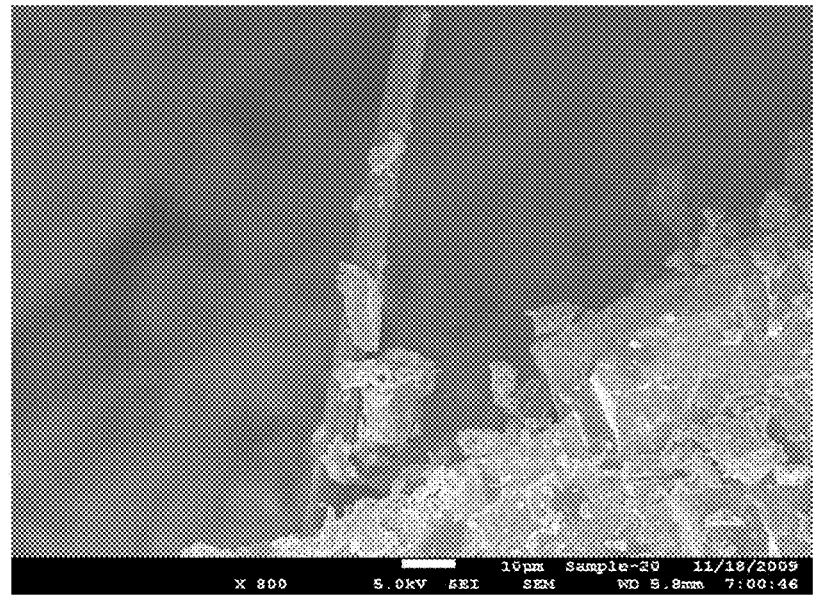
FIGS. 4(a), 4(b) and 4(c) depict SEM images of the fracture surfaces of ultra-high-performance cementitious matrix reinforced with carbon microfibers and PAA-physisorbed carbon nanofibers dispersed using optimum stirring and sonication procedures.
Figure 4:
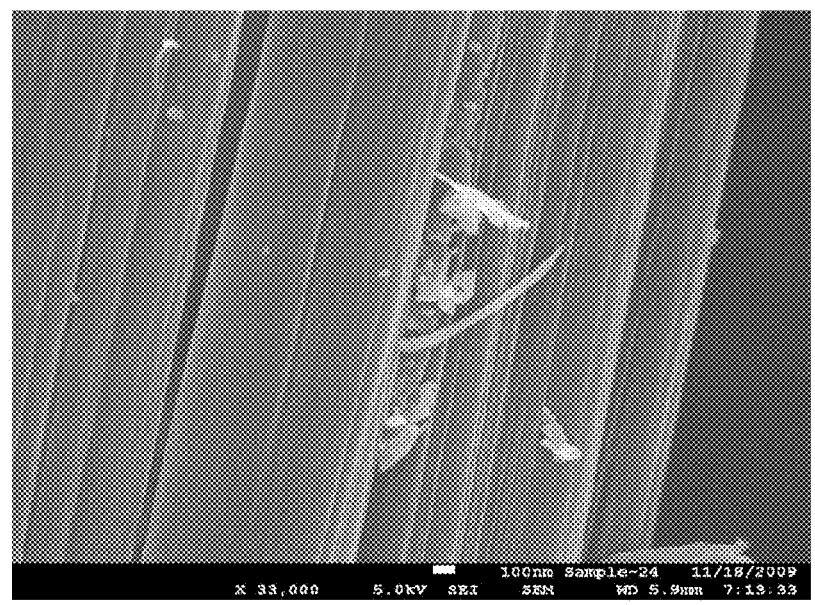
Figure 4:
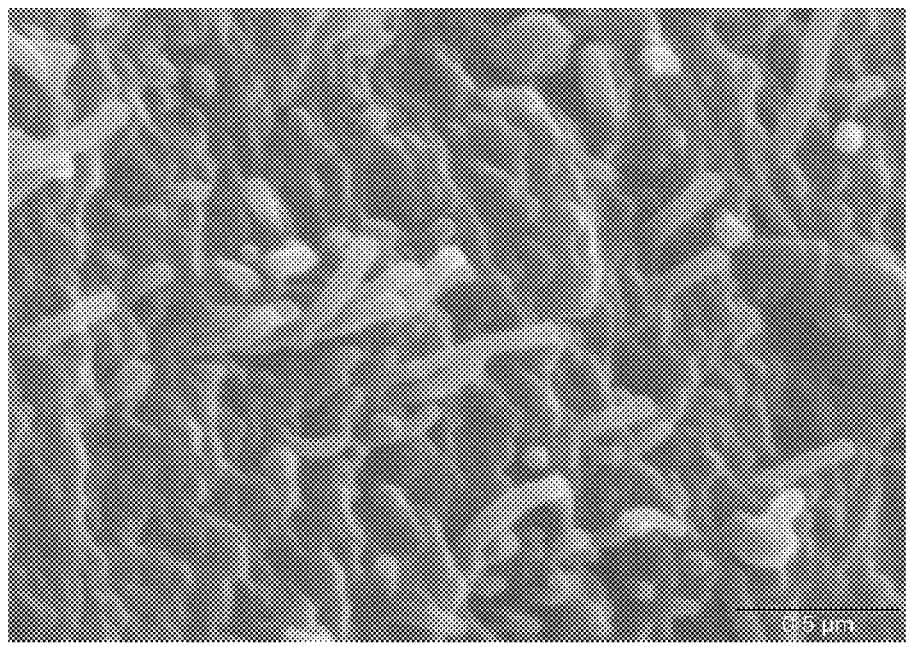
Figure 5:
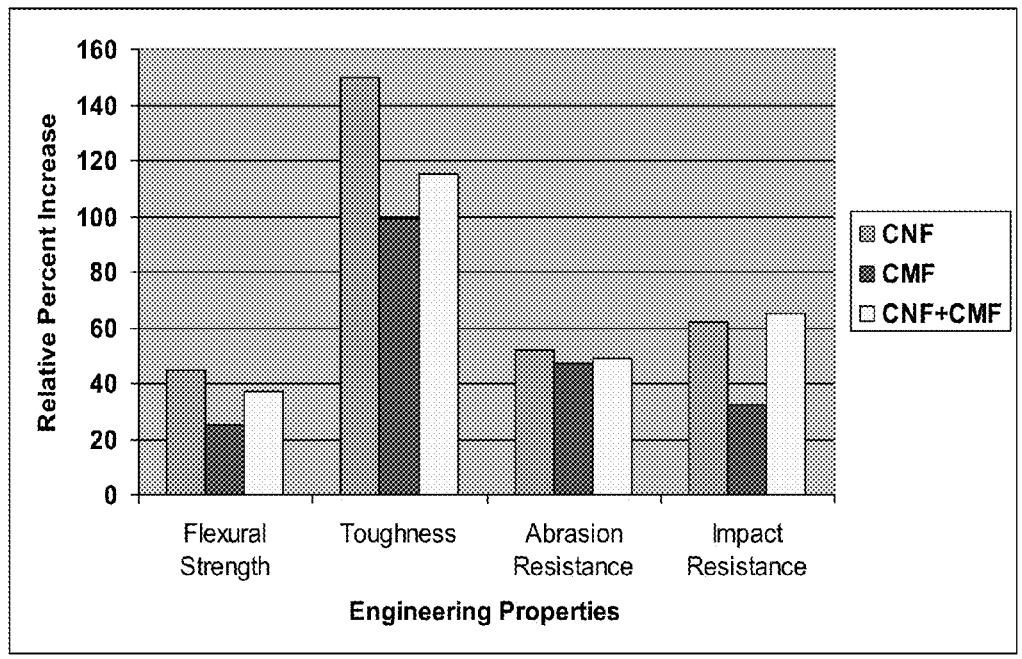
FIG. 5 is a graph presenting the relative increase in performance characteristics of ultra-high-performance cementitious matrix reinforced with carbon microfibers and/or PAA-physisorbed carbon nanofibers dispersed using optimum stirring and sonication procedures.
Figure 6:
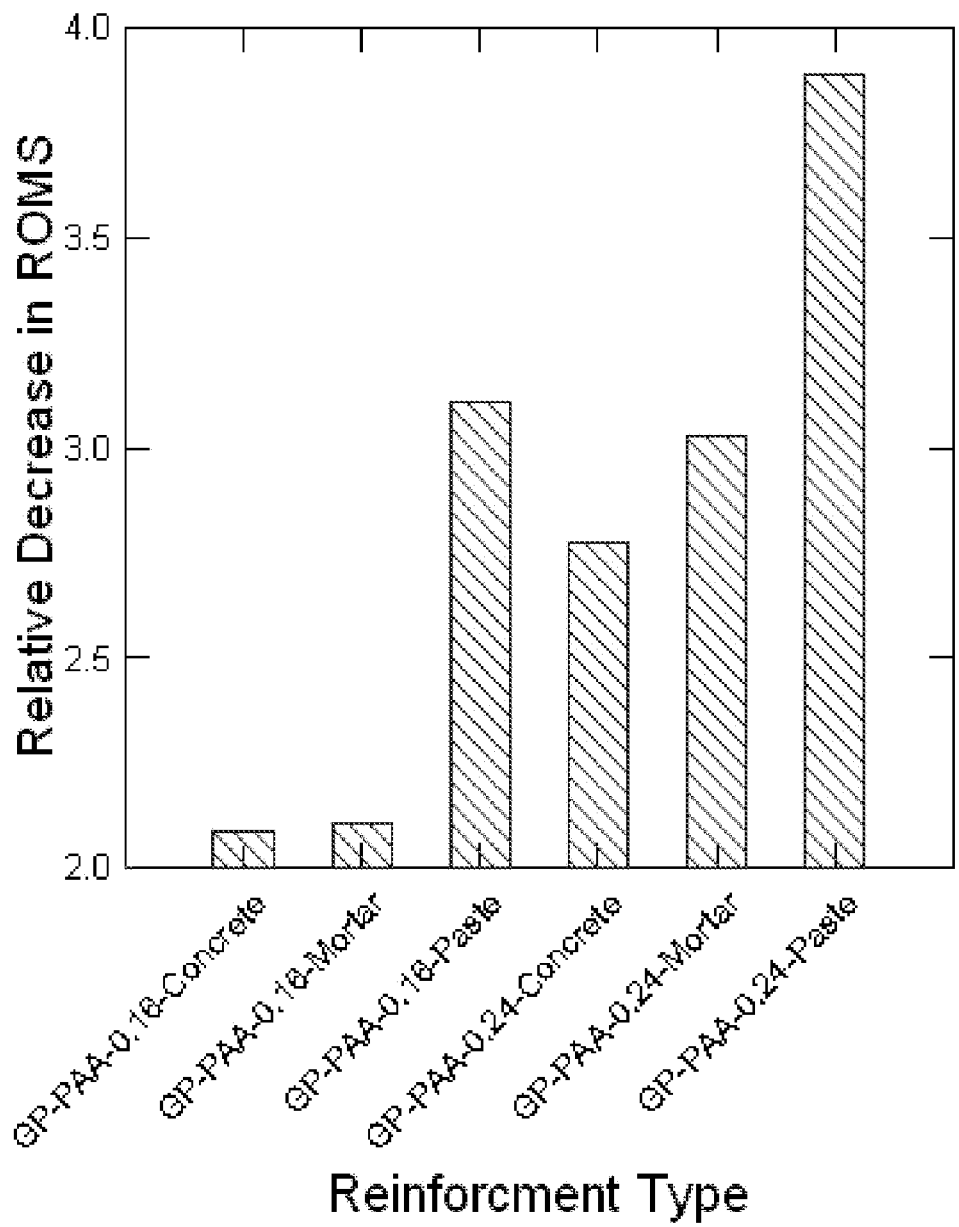
FIG. 6 is a graph presenting drop in rate of moisture sorption of ultra-high-performance cementitious matrices reinforced at different volume percent of graphite nanoplatelets, dispersed using optimum stirring and sonication procedure.
Figure 7:
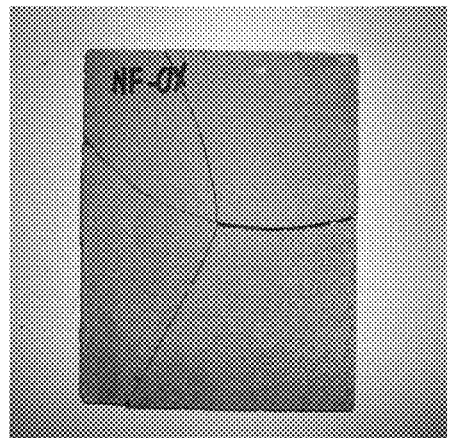
FIG. 7 is a photograph showing the visual appearance of various test specimens before and after the performance of tests.
Figure 7:
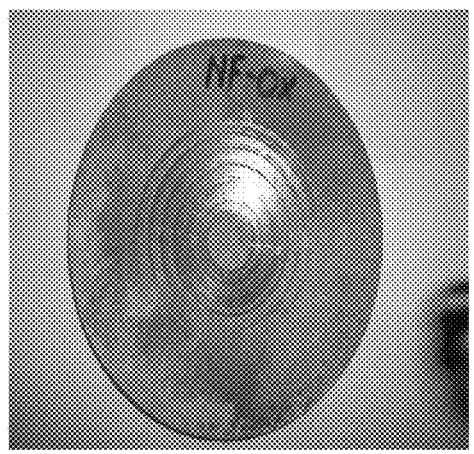

The present invention is directed to a method of producing ultra-high-performance cementitious matrices reinforced with uniformly dispersed, PAA-physisorbed carbon nanofibers or nanoplatelets. Uniform dispersion of nanomaterials in a fraction of the mixing water of cementitious matrix is enabled by optimum stirring and ultrasonication, and is facilitated through polymer-wrapping of nanomaterials by introducing high-molecular-weight polyelectrolytes and surfactants. These procedures are applicable to graphite nanomaterials of different types and aspect ratios, used in different cementitious matrices at various volume fractions.

The optimized method for dispersing graphite nanomaterials in water involves:
- Addition of the required amount of graphite nanomaterials and polyacrylic acid (PAA) in 1:1 weight ratio to a fraction of the mixing water of the cementitious material.
- Stirring of the mixture for 1 minute to 15 hours.
- Sonication of the mixture using a probe as follows: (i) sonicate for 1 to 10 minutes in steps of increasing sonication amplitude, with the sonicator turned off for five seconds to one minute before it is turned on at the higher amplitude of the next step; (ii) Turn the sonicator on at a relatively high amplitude for 2 seconds to 1 minute, and off for 2 to 30 seconds, continued over a period of 1 to 10 minutes; (iii) turn off the sonicator for 10 seconds to 2 minutes; (iv) repeat Step ii; and (v) repeat Steps I through iv at least one more time.
- When microfibers are used together with graphite nanomaterials (i.e., for hybrid reinforcement), the microfibers were added to the mixing water (without using the above dispersion procedure) thirty minutes before mixing with other ingredients.

This dispersion procedure described above produces a stable solution of graphite nanomaterials for nanomaterial dosages ranging from 0.03 to 0.6% volume fraction of the binder This procedure for dispersion of graphite nanomaterial in water can be used in any application that requires a stable dispersion of graphite nanomaterials in water.

The nanomaterials dispersed in water are then mixed with other ingredients of a well-graded cementitious matrix to produce cementitious nanocomposites incorporating uniformly dispersed nanomaterials with desired interfacial bonding. Such well-graded cement-based matrices comprise particles of different size, ranging is size from nano- and micro-scale cementitious powder to millimeter- and centimeter-scale aggregates, which are densified using a superplasticizer [16]. This basic approach to mix design, when used together with high-quality discrete reinforcement, yields highly desired combinations of mechanical, barrier and durability characteristics for demanding fields of application [16].

The general approach to preparation of cementitious materials with graphite nanomaterial reinforcement comprises: (i) dry mixing of cementitious and aggregate materials; (ii) addition of the graphite nanomaterials dispersed in water along with any microfibers to the mixer; (iii) mixing of all ingredients using different mixing speeds and durations; (iv) placement and consolidation of the cementitious material; and (v) curing in moist environment at room or elevated temperature. Examples of the compositions (by weight) of cementitious binders which interact effectively with graphite nanomaterials are presented below.

Cementitious Paste: cement (0.8), silica fume (0.2), water (0.24), superplasticizer (variable—increases with reinforcement content).

Cementitious Mortar: cement (0.8), silica fume (0.2), water (0.24), 0-0.18 mm silica sand (0.36), 0.18-0.5 mm silica sand (0.86), superplasticizer (variable—increases with reinforcement content).

Cementitious Concrete: Cementitious Mortar: cement (0.8), silica fume (0.2), water (0.26), 0-0.18 mm silica sand (0.36), 0.18-0.5 mm silica sand (0.86), granite gravel with 10 mm maximum particle size (0.50), Superplasticizer (variable—increases with reinforcement content).

The well-dispersed and properly bonded nanomaterials would, at relatively low dosages (~0.1%, by volume of the cementitious binder) bring about important gains in the fracture toughness, crack resistance, impact and abrasion resistance, barrier qualities, durability and other engineering properties of the cementitious matrix at competitive cost. As the cementitious matrix gets coarser with the addition of sand (producing mortar) and gravel (producing concrete), use of microfiber, in conjunction with graphite nanomaterials, renders synergistic effects through bridging across wider cracks and providing for extended pullout and frictional energy dissipation.

The invention claimed is:

1. An ultra-high-performance cement nanocomposites in which nanomaterials are dispersed, obtained by blending with water a composition comprising:
cementitious materials comprising cement and supplementary cementitious materials with minimum particle size smaller than that of cement at 5% to 70% by weight of cement, with the weight ratio of water to cementitious materials ranging from 0.10 to 0.55;
nanomaterials comprising at least one of carbon nanofibers and graphite nanoplatelets at 0.01% to 5% by weight of cementitious materials;
dispersants comprising at least one of polyelectrolytes and surfactants at 0.1% to 100% by weight of nanomaterials;
aggregates with particle size ranging from 0.01 mm to 50 mm at 10% to 800% by weight of cementitious materials;
at least one of fibers other than carbon nanofibers of 1 to 1000 micrometer diameter with length-to-diameter ratio of at least 10, and whiskers of 0.1 to 10 micrometer diameter with length-to-diameter ratio of at least 5, at a dosage ranging from 0.05% to 10% by weight of cementitious materials;
concrete chemical admixtures.

2. A hardened ultra-high-performance cement nanocomposite in which nanomaterials are dispersed, obtained by blending with water a composition comprising:
cementitious materials comprising cement and supplementary cementitious materials with minimum particle size smaller than that of cement at 5% to 70% by weight of cement, with the weight ratio of water to cementitious materials ranging from 0.10 to 0.55;
nanomaterials comprising at least one of carbon nanofibers and graphite nanoplatelets at 0.01% to 5% by weight of cementitious materials;
dispersants comprising at least one of polyelectrolytes and surfactants at 0.1% to 100% by weight of nanomaterials;
aggregates with particle size ranging from 0.01 mm to 50 mm at 10% to 800% by weight of cementitious materials;
at least one of fibers of 1 to 1000 micrometer diameter with length-to-diameter ratio of at least 10, and whiskers of 0.1 to 10 micrometer diameter with length-to-diameter ratio of at least 5, at a dosage ranging from 0.05% to 10% by weight of cementitious materials;
concrete chemical admixtures.

3. The ultra-high-performance cement nanocomposite according to claim 1, wherein at least one of the carbon nanofibers and the graphite nanoplatelets are oxidized in order to enhance the interactions of their surfaces with at least one of polyelectrolytes, surfactants, water molecules, and cement hydrates.

4. The ultra-high-performance cement nanocomposite according to claim 1, wherein the polyelectrolyte comprises at least one of poly(acrylic acid), poly(ethyleneimine) and poly(vinyl alcohol).

5. The ultra-high-performance cement nanocomposite according to claim 1, wherein the surfactant comprises at least one of water-reducers and high-range water-reducers based on polycarboxylate, sulfonated mealmine-formaldehyde condensate, sulfonated naphthalene-formaldehyde condensate, and modified lignosulfonate.

6. The ultra-high-performance cement nanocomposite according to claim 1, wherein the carbon nanofibers are 5 to 150 nanometer in diameter and 5 to 200 micrometer in length, and the graphite nanoplatelets are 1 to 50 nanometer in thickness and 5 to 200 micrometer in planar dimension.

7. The ultra-high-performance cement nanocomposite according to claim 1, wherein the fibers comprise at least one of polypropylene, nylon, polyvinyl alcohol, glass, steel, carbon, aramid and cellulose fibers.

8. The ultra-high-performance cement nanocomposite according to claim 1, wherein the whiskers comprise at least one of metal, ceramic and polymer whiskers.

9. The ultra-high-performance cement nanocomposite according to claim 1, wherein the dispersant-to-nanomaterial weight ratio ranges from 0.01 to 0.5.

10. The ultra-high-performance cement nanocomposite according to claim 1, wherein the aggregate particle size ranges from 0.1 to 25 mm.

11. The ultra-high-performance cement nanocomposite according to claim 1, wherein the aggregate content ranges from 20% to 400% by weight of cementitious materials.

12. The ultra-high-performance cement nanocomposite according to claim 1, wherein the weight ratio of total water to cementitious materials ranges from 0.15 to 0.40.

13. The ultra-high-performance cement nanocomposite according to claim 1, wherein the supplementary cementitious materials comprise at least one of silica fume, rice husk ash, ground granulated blast furnace slag, coal fly ash and milled glass.

14. The ultra-high-performance cement nanocomposite according to claim 1, wherein the concrete chemical admixtures are at least one of air-entraining agents, water-repellants, shrinkage-reducing admixtures, shrinkage-compensating admixtures, water-reducers, high-range water-reducers, set retarders, set accelerators, coloring agents, and latex polymers.

15. The ultra-high-performance cement nanocomposite according to claim 1, wherein the aggregates are at least one of concrete normal-weight, light-weight and heavy-weight aggregates.

16. The ultra-high-performance cement nanocomposite according to claim 1, wherein the cement is at least one of Portland cements, blended cements, expansive cements, rapid setting and hardening cements, white cements, colored cements, and calcium aluminate cements.

17. A method of making ultra-high-performance cement nanocomposites, comprising the steps of:
preparation of a water-containing mixture by addition of nanomaterials comprising at least one of carbon nanofibers and graphite nanoplatelets, and dispersants comprising at least one of polyelectrolytes and surfactants to a fraction, ranging from 5% to 100%, of the mixing water of the cement nanocomposite, with dispersant-to-nanomaterial weight ratio ranging from 0.001 to 1, and graphite nanomaterial concentration in water ranging from 0.01 to 30 weight percent;

stirring the water-containing mixture at a speed of 1 to 100 rounds per second over a period of 30 seconds to 15 hours;

ultrasonication of the water-containing mixture over a period of 30 seconds to 4 hours;

separate preparation of a dry blend comprising cementitious materials and aggregates, with said cementitious materials comprising cement, supplementary cementitious materials with minimum particle size smaller than that of cement at 5% to 70% by weight of cement, and said aggregates comprising at least one of normal-weight, light-weight and heavy-weight concrete aggregates with particle size ranging from 0.01 mm to 50 mm at 10% to 800% by weight of cement, with said dry blend providing a smooth particle size distribution, covering the nanometer up to centimeter scales, which allows for development of a densely packed structure;

addition of at least one of fibers with 1 to 1000 micrometer diameter and whiskers with 0.1 to 10 micrometer diameter, at a dosage ranging from 0.05% to 10% by weight of cementious materials, to at least one of the water-containing mixture and the dry blend;

addition of the water-containing mixture, the remainder of mixing water for achieving a weight ratio of total water to the cementitious materials ranging from 0.10 to 0.55, and concrete chemical admixtures to the dry blend, and use of conventional mixing, casting, consolidation and curing methods to prepare cement nanocomposite products.

18. The method of making cement nanocomposites according to claim 17, wherein at least one of the carbon nanofibers and the graphite nanoplatelets are oxidized in order to enhance the interactions of their surfaces with at least one of polyelectrolytes, surfactants, water molecules, and cement hydrates.

19. The method of making cement nanocomposites according to claim 17, wherein the polyelectrolyte comprises at least one of poly(acrylic acid), poly(ethyleneimine) and poly(vinyl alcohol).

20. The method of making cement nanocomposites according to claim 17, wherein the surfactant comprises at least one of water-reducers and high-range water-reducers based on polycarboxylate, sulfonated mealmine-formaldehyde condensate, sulfonated naphthalene-formaldehyde condensate, and modified lignosulfonate.

21. The method of making cement nanocomposites according to claim 17, wherein the carbon nanofibers are 5 to 150 nanometer in diameter and 5 to 200 micrometer in length, and the graphite nanoplatelets are 1 to 50 nanometer in thickness and 5 to 200 micrometer in planar dimension.

22. The method of making cement nanocomposites according to claim 17, wherein the fibers comprise at least one of polypropylene, nylon, polyvinyl alcohol, glass, steel, carbon, aramid and cellulose fibers.

23. The method of making cement nanocomposites according to claim 17, wherein the whiskers comprise at least one of metal, ceramic and polymer whiskers.

24. The method of making cement nanocomposites according to claim 17, wherein the dispersant-to-nanomaterial weight ratio ranges from 0.01 to 0.5.

25. The method of making cement nanocomposites according to claim 17, wherein the aggregate particle size ranges from 0.1 to 25 mm.

26. The method of making cement nanocomposites according to claim 17, wherein the aggregate content ranges from 20% to 400% by weight of cementitious materials.

27. The method of making cement nanocomposites according to claim 17, wherein the weight ratio of total water to cementitious materials ranges from 0.15 to 0.40.

28. The method of making cement nanocomposites according to claim 17, wherein the supplementary cementitious materials comprise at least one of silica fume, rice husk ash, ground granulated blast furnace slag, coal fly ash and milled glass.

29. The method of making cement nanocomposites according to claim 17, wherein the concrete chemical admixtures are at least one of air-entraining agents, water-repellants, shrinkage-reducing admixtures, shrinkage-compensating admixtures, water-reducers, high-range water-reducers, set retarders, set accelerators, coloring agents and latex polymers.

30. The method of making cement nanocomposites according to claim 17, wherein the aggregates are at least one of concrete normal-weight, light-weight and heavy-weight aggregates.

31. The method of making cement nanocomposites according to claim 17, wherein the cement is at least one of Portland cements, blended cements, expansive cements, rapid setting and hardening cements, white cements, colored cements, and calcium aluminate cements.

\* \* \* \* \*